United States Patent
Keskikangas et al.

(10) Patent No.: US 11,831,789 B2
(45) Date of Patent: Nov. 28, 2023

(54) SYSTEMS AND METHODS OF MANAGING A CERTIFICATE ASSOCIATED WITH A COMPONENT LOCATED AT A REMOTE LOCATION

(71) Applicant: Axis AB, Lund (SE)

(72) Inventors: Axel Keskikangas, Lund (SE); Johnny Wahnström, Lund (SE); Ola Mårtensson, Lund (SE); Pernilla Allansson, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 17/530,721

(22) Filed: Nov. 19, 2021

(65) Prior Publication Data
US 2022/0166637 A1   May 26, 2022

(30) Foreign Application Priority Data
Nov. 24, 2020 (EP) .................................... 20209481

(51) Int. Cl.
*H04L 9/32* (2006.01)
(52) U.S. Cl.
CPC .......... *H04L 9/3268* (2013.01); *H04L 9/3271* (2013.01); *H04L 9/321* (2013.01)
(58) Field of Classification Search
CPC ...... H04L 9/3268; H04L 9/3271; H04L 9/321
USPC ....................................................... 713/156
See application file for complete search history.

(56) References Cited

U.S. PATENT DOCUMENTS

| | | | |
|---|---|---|---|
| 7,827,599 B2* | 11/2010 | Fisher | H04L 9/3263 |
| | | | 726/19 |
| 10,454,919 B2 | 10/2019 | Goldman | |
| 2004/0003249 A1 | 1/2004 | Dabbish et al. | |
| 2005/0144463 A1* | 6/2005 | Rossebo | H04L 63/0815 |
| | | | 713/185 |
| 2008/0134311 A1* | 6/2008 | Medvinsky | G06F 21/33 |
| | | | 726/12 |
| 2011/0213967 A1* | 9/2011 | Wnuk | H04L 9/3268 |
| | | | 713/158 |
| 2012/0137129 A1 | 5/2012 | Busser et al. | |

(Continued)

FOREIGN PATENT DOCUMENTS

WO    2012/040840 A1    4/2012

OTHER PUBLICATIONS

Schaad, "Internet X 509 Puplic Key Infrastucture certificate request message format (CRMF)," Soaring Hawk Consulting (Sep. 2005).

(Continued)

*Primary Examiner* — Moeen Khan
(74) *Attorney, Agent, or Firm* — Volpe Koenig

(57) ABSTRACT

Systems and methods of managing a certificate associated with a component located at a remote location from a certificate authority system are provided. A certificate request is received, wherein the certificate request comprises a key associated with the component. A certificate is generated corresponding to the key received in the certificate request, and a validity status of the certificate is caused to be set to invalid. The certificate is provided to the component and it is determined whether the component matches the certificate. Upon determining that the component matches the certificate, the validity status is caused to be set to valid.

10 Claims, 4 Drawing Sheets

(56) References Cited

U.S. PATENT DOCUMENTS

| | | | |
|---|---|---|---|
| 2015/0095995 A1* | 4/2015 | Bhalerao | H04L 63/0823 |
| | | | 726/6 |
| 2015/0244709 A1 | 8/2015 | Goldman | |
| 2019/0123903 A1* | 4/2019 | Fu | H04L 9/321 |
| 2019/0180371 A1* | 6/2019 | Benkert | H04L 9/3263 |
| 2021/0021586 A1* | 1/2021 | Koike | H04L 63/0823 |

OTHER PUBLICATIONS

Extended European Search Report dated Apr. 26, 2021 for European Patent Application No. 20209481.9.

* cited by examiner

SYSTEMS AND METHODS OF MANAGING A CERTIFICATE ASSOCIATED WITH A COMPONENT LOCATED AT A REMOTE LOCATION

FIELD OF INVENTION

The present invention relates to certificates used for authentication, and specifically to methods for managing a certificate associated with a component.

TECHNICAL BACKGROUND

When assembling a device, the device may be provided with a component, such as a secure element, a trusted platform module or any type of secure cryptoprocessor, and the component may be provided with a certificate issued by a certificate authority system of a trusted certificate authority system. The certificate is to be used to identify and authenticate the device. The manufacturer of the device may not be in control of the component from purchase to mounting in the device during assembly. For example, the component may be purchased from one supplier and then provided to a separate party for assembly in the device at a location remote from the certificate authority system. Hence, the manufacturer of the device does not want the certificate to be provided to the component before being in control of the component. Typically, the certificate should not be provided to the component before a predetermined event of the assembly, e.g., when the component has been mounted in the device. At the same time, the provision of the certificate should not be delayed, as such a delay may delay the assembly of the device. Hence, there is a timing issue for providing the certificate to the component. Before the certificate is provided from the certificate authority system to the component an authentication needs to be performed, e.g., by means of a challenge, to make sure that the component matches the certificate. This however, may be subject to connection issues if a connection between the certificate authority system and the location of the component during mounting is not available at the predetermined event. This is relevant for all cases when a certificate should be provided to a component at a specific point in time where the component is located at a remote location from the certificate authority system and there may be issues with the availability of a connection between the certificate authority system and the component at the remote location at that point in time.

SUMMARY

Providing methods and systems for managing a certificate of a component which overcomes or mitigates issues in known methods and systems would be beneficial over prior systems.

According to a first aspect, a method in a certificate authority system of managing a certificate associated with a component located at a remote location from the certificate authority system is provided. The method comprises receiving a certificate request, wherein the certificate request comprises a key associated with the component, generating a certificate corresponding to the key received in the certificate request, and causing a validity status of the certificate to be set to invalid. Subsequent to causing the validity status of the certificate to be set to invalid, the method further comprises providing the certificate to the component. Subsequent to providing the certificate to the component, the method further comprises determining whether the component matches the certificate, and, upon determining that the component matches the certificate, causing the validity status to be set to valid.

By generating the certificate and causing the validity status of the certificate to be set to invalid, the certificate can be provided to the component at any time because the certificate cannot be validly used, e.g., by an unauthorised party, as long as its validity status is set to invalid. Specifically, the certificate need not be provided at a specific point in time when the component is located at the remote location from the certificate authority system and there may be issues with the availability of a connection between the certificate authority system and the component at the remote location. The validity status is then caused to be set to valid upon determining that the component matches the certificate. Furthermore, if the certificate should be provided to the component at a specific point in time, this may be done without delay since there is no need for matching the certificate and the component before provision. The validity status will be invalid until such matching has been performed. For example, if the component is to be mounted in a device being assembled, the process of assembly is not affected by any delays due to any need for realtime control of matching from the certificate authority system in order to provide the certificate to the component. Such matching may be performed at any time after the provisioning.

For example, the certificate may be provided to the component before it is mounted in a device and then, when the component has been mounted in the device, it may be checked whether the component matches the certificate. The validity status is then caused to be set to valid upon determining that the component matches the certificate.

The inventors have realized that rather than controlling the timing of the provision of the certificate in the component, the validity status of the certificate is controlled such that the validity status of the certificate is not caused to be valid until it has been determined that a specific condition has been met, such as that the component matches the certificate.

Determining whether the component matches the certificate may be done based on many different conditions relating to the properties of the component and the certificate, respectively, including stored information, current status and location. For example, the component may be determined to match the certificate based on the key of the component, which is also the key corresponding to which the certificate has been generated for.

A validity status of a certificate being invalid is intended to convey to a recipient that the certificate is currently not to be trusted and for example is not to be considered valid for use for authorisation. Different terms such as invalid, revoked, on hold, unknown etc may be used depending on the type of system used. The terms of this non-exhaustive list are all intended to be covered by the term invalid.

By a validity status of a certificate being valid means that the certificate is currently valid for use for authorisation. Different terms such as valid, good etc may be used depending on the type of system used all intended to be covered by the term valid.

Causing the validity status of the certificate to be invalid and valid enables a third party to check the validity status of the certificate e.g., by requesting or accessing the validity status of the certificate.

The remote location may for example be a location where the component is mounted in a device.

The act of providing the certificate to the component may comprise sending the certificate to the component directly or indirectly via a remote server located at the remote location.

By providing the certificate directly from the certificate authority server to the component, the certificate may be provided to the component at any time. For example, the certificate may be provided to the component before the component is transferred to the remote location.

When the certificate is provided directly from the certificate authority server to the component, for the component to be determined to match the certificate it may be required to prove that it is mounted in the device. For example, for a component that can initiate communication with other parts of the device by itself, a mechanism for establishing a two-way trust relationship could be realised. This could e.g., be done in the same way that trust is established between a web browser and servers on the internet—by checking a peer's certificate and validating it against a root of trust in the device manufacturer established at the time the component is manufactured by the component supplier. That in turn means that the device will need to be provided with a certificate—vouched for by the root of trust put into the component by the manufacturer. It could then include the certificate of the device in the signed challenge response which eventually ends up being checked by the certificate authority system who can then check that A) the component certificate has been given to the correct component and B) the component has been mounted in the correct device. In alternative, a sort of ticket/token system may be used wherein the device has some 'secret' that it provides to the component which is included in the mounting proving statement. As a further alternative, a sort of 'eventual reciliation' protocol may be used wherein a mounting proving statement issued in relation to a component contains the device identity (not secret) of the device in which the component is mounted. The device identity is then categorized as 'claimed' in a database, and if duplicate device identity claims are encountered, certificates of components relating to the duplicate device identity claims are set to invalid and the problem is investigated.

By providing the certificate indirectly from the certificate authority server to the component via a remote server located at the remote location, the certificate may be stored locally at the remote server until a predetermined event when the certificate should be provided to the component.

When the certificate is provided indirectly from the certificate authority server to the component via the remote server located at the remote location, the certificate may be provided to the component from the remote server upon determining that the component has been mounted in the device.

The act of determining whether the component matches the certificate may comprise receiving, from the remote server, a verification that the component matches the certificate, and, upon receiving the verification, determining that the component matches the certificate.

The remote server may be used to determine whether the component matches the certificate. The validity status is caused to be set to invalid and then kept invalid until a verification is received in the certificate authority system from the remote server that the component matches the certificate upon which the component is determined to match the certificate and the validity status of the certificate is caused to be set to valid.

The act of determining whether the component matches the certificate may comprise receiving, from the component directly or indirectly via a remote server located at the remote location, a message based on which the certificate authority system can determine whether the component matches the certificate, and determining, based on the message, whether the component matches the certificate.

The act of determining whether the component matches the certificate may comprise sending, to the component directly or indirectly via a remote server located at the remote location, a challenge for checking whether the component matches the certificate, receiving, from the component directly or indirectly via the remote server, a response to the challenge, and determining whether the response to the challenge verifies that the component matches the certificate.

The key may be a public key of a private/public key pair associated with the component.

The component may be said to match the certificate if the component can prove that it is in possession of a private key of the private/public key pair associated with the component.

The certificate request may further comprise a device identity of a device in which the component is to be installed. The component may then be said to match the certificate if the component is installed in the device having the device identity.

The act of causing the validity status of the certificate to be set to invalid may comprise sending, to a validity service system, information indicating that the certificate has been generated, and sending, to the validity service system, an instruction to set the certificate to invalid. The act of causing the validity status to be set to valid may then comprise sending, to the validity service system, an instruction to set the certificate to valid.

According to a second aspect, a non-transitory computer-readable storage medium is provided having stored thereon instructions for implementing the method according to the first aspect when executed by a system having processing capabilities.

The above-mentioned features of the method according to the first aspect, when applicable, apply to the non-transitory computer-readable storage medium of the second aspect as well.

According to a third aspect, a certificate authority system is provided for managing a certificate associated with a component located at a remote location from the certificate authority system. The certificate authority system comprises circuitry configured for performing the method according to the first aspect.

The above-mentioned features of the method according to the first aspect, when applicable, apply to the certificate authority system of the third aspect as well.

According to a fourth aspect, a method in a certificate managing system of managing a certificate associated with a component is provided. The certificate managing system comprises a certificate authority system, and a validity service system, the component being located at a remote location from the certificate authority system. The method comprises receiving, in the certificate authority system, a certificate request, wherein the certificate request comprises a key associated with the component, generating, in the certificate authority system, a certificate corresponding to the key received in the certificate request, and sending, from the certificate authority system to the validity service system, information indicating that the certificate has been generated. The method further comprises causing a validity status of the certificate to be set to invalid by sending, from the certificate authority system to the validity service system, an instruction to set the certificate to invalid, and setting, in the validity service system, the certificate to invalid. Subsequent to causing the validity status of the certificate to be set to invalid, the method further comprises providing the certificate from the certificate authority system to the component. Subsequent to providing the certificate from the certificate authority system to the component, the method further comprises determining, in the certificate authority system, whether the component matches the certificate, upon determining that the component matches the certificate, causing the validity status to be set to valid by sending, from the certificate authority system to the validity service system, an instruction to set the certificate to valid, and indicating, in the validity service system, the certificate as valid.

The system of managing a certificate may further comprise a remote server located at the remote location, and the act of providing the certificate from the certificate authority system to the component may comprises sending the certificate from the certificate authority system to the remote server, and sending the certificate from the remote server to the component.

The act of sending the certificate from the remote server to the component may be performed upon determining by the remote server that the component is installed in a device in which the component is to be installed. Hence, it is guaranteed that the certificate is not sent to the component before the component has been installed in the device. The certificate may however be issued and provided to the remote server in advance of installing the component. This is beneficial since such providing may be done at a time in advance when a connection between the certificate authority system and the remote location is available or by some other means. The sending of the certificate to the component may be done locally at the remote location without being dependent of any connection between the certificate authority system and the remote location.

The act of determining, in the certificate authority system, whether the component matches the certificate may further comprise determining, in the remote server, whether the component matches the certificate, upon determining, in the remote server, that the component matches the certificate, sending, from the remote server to the certificate authority system, a verification that the component matches the certificate, and upon receiving the verification, determining, in the certificate authority system, that the component matches the certificate.

The act of determining, in the remote server, whether the component matches the certificate may comprise sending, from the remote server to the component, a challenge for checking whether the component matches the certificate, determining, in the component, a response to the challenge, sending, from the component to the remote server, the response to the challenge, and determining, in the remote server, whether the response to the challenge verifies that the component matches the certificate.

The act of determining, in the certificate authority system, whether the component matches the certificate may comprise sending, from the certificate authority system to the component, a challenge for checking whether the component matches the certificate, determining, in the component, an answer to the challenge, sending, from the component to the certificate authority system, the answer to the challenge, and determining, in the certificate authority system, whether the response to the challenge verifies that the component matches the certificate.

The key may be a public key of a private/public key pair associated with the component.

The component may be said to match the certificate if the component can prove it is in possession of a private key of the private/public key pair associated with the component.

The certificate request may further comprise a device identity of a device in which the component is to be installed. The component may then be said to match the certificate if the component is installed in the device having the device identity.

According to a fifth aspect, a non-transitory computer-readable storage medium is provided having stored thereon instructions for implementing the method according to the fourth aspect when executed by a system having processing capabilities.

The above-mentioned features of the method according to the forth aspect, when applicable, apply to the non-transitory computer-readable storage medium of the fifth aspect as well.

According to a sixth aspect, a certificate managing system of managing a certificate associated with a component located at a remote location from the certificate authority system is provided. The certificate managing system comprises a certificate authority system, and a validity service system. The certificate authority system comprises first circuitry configured for receiving a certificate request, wherein the certificate request comprises a key associated with the component, generating a certificate corresponding to the key received in the certificate request, and sending, to the validity service system, information indicating that the certificate has been generated. The first circuitry is further configured for causing a validity status of the certificate to be set to invalid by sending, to the validity service system, an instruction to set the certificate to invalid, subsequent to causing the validity status of the certificate to be set to invalid, providing the certificate from the certificate authority system to the component, subsequent to providing the certificate from the certificate authority system to the component, determining whether the component matches the certificate, and upon determining that the component matches the certificate, causing the validity status to be set to valid by sending, to the validity service system, an instruction to set the validity status of the certificate to valid. The validity service system further comprises second circuitry configured for, upon receiving the instruction to set the certificate to invalid, setting the validity status of the certificate to invalid, and, upon receiving the instruction to set the validity status of the certificate to valid, setting the validity status of the certificate to valid.

The certificate managing system may further comprise a remote server located at the remote location, wherein the first circuitry of the certificate authority system is further configured for sending the certificate to the remote server. The remote server may further comprise third circuitry configured for sending the certificate to the component.

The third circuitry may further be configured for sending the certificate to the component upon determining that the component is installed in a device in which the component is to be installed. Hence, it is guaranteed that the certificate is not sent to the component before the component has been installed in the device. The certificate may however be issued and provided to the remote server in advance of installing the component. This is beneficial since such providing may be done at a time in advance when there a connection between the certificate authority system and the remote location is available or by some other means. The sending of the certificate to the component may be done locally at the remote location without being dependent of any connection between the certificate authority system and the remote location.

The third circuitry may further be configured for determining whether the component matches the certificate, and, upon determining that the component matches the certificate, sending, to the certificate authority system, a verification that the component matches the certificate. The first circuitry of the certificate authority system may be further configured for, upon receiving the verification from the remote server, determining that the component matches the certificate.

The above-mentioned features of the method according to the forth aspect, when applicable, apply to the certificate managing system of the sixth aspect as well.

A further scope of applicability will become apparent from the detailed description given below. However, it should be understood that the detailed description and specific examples, while indicating preferred embodiments, are given by way of illustration only, since various changes and modifications within the scope of the claims will become apparent to those skilled in the art from this detailed description.

Hence, it is to be understood that the embodiments are not limited to the particular component parts of the systems described or acts of the methods described as such device and method may vary. It is also to be understood that the terminology used herein is for purpose of describing particular embodiments only and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects will now be described in more detail, with reference to appended figures. The figures should not be considered limiting but are instead used for explaining and understanding. Like reference numerals refer to like elements throughout.

DETAILED DESCRIPTION

The present concepts will now be described more fully hereinafter with reference to the accompanying drawings, in which currently preferred embodiments of the invention are shown. These concepts may, however, be embodied in many different forms and should not be construed as limited to the embodiments set forth herein. Rather, these embodiments are provided for thoroughness and completeness, and to convey the concepts to the skilled person.

Figure 1:
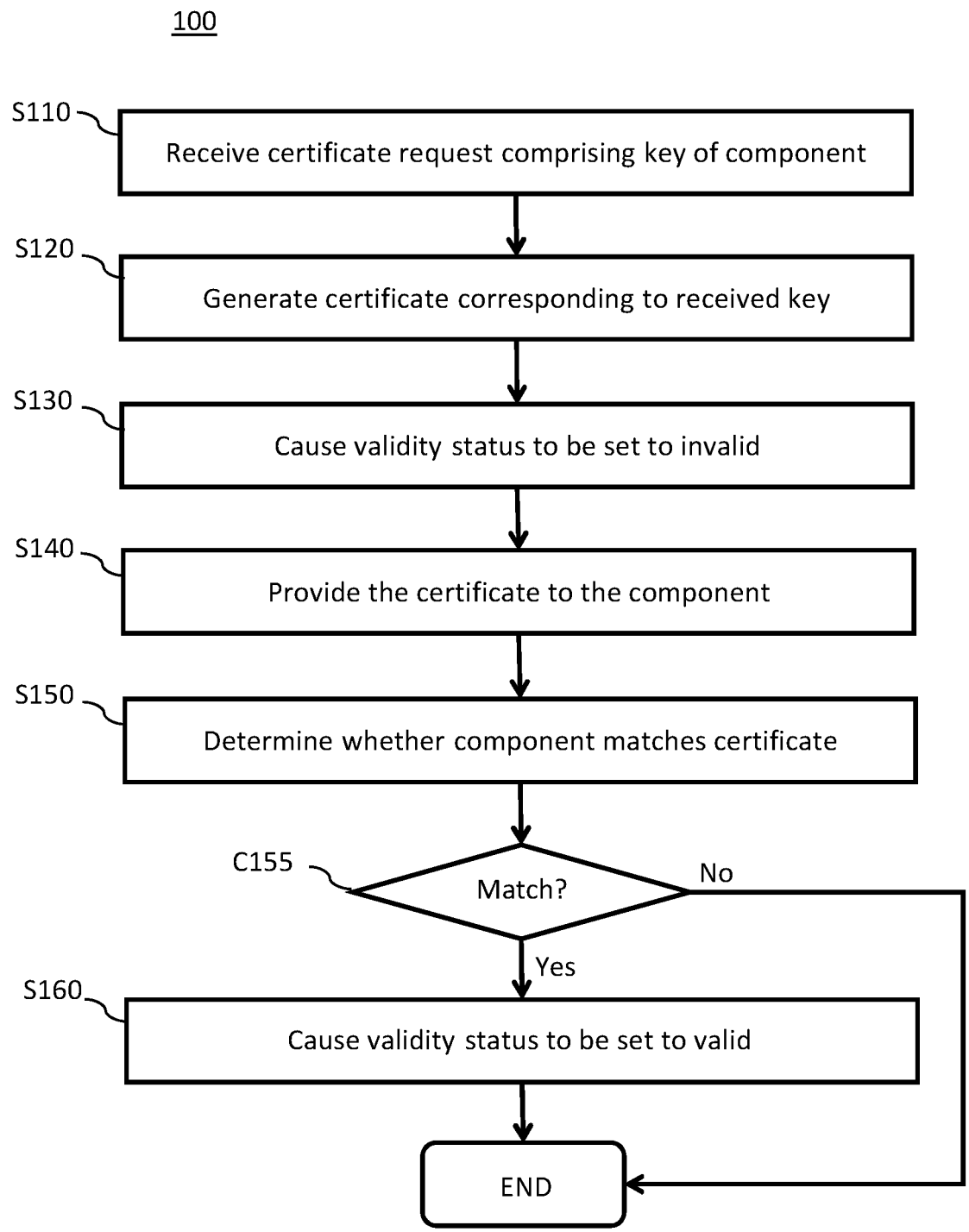
FIG. 1 is a flow chart of embodiments of a method in a certificate authority system of managing a certificate associated with a component located at a remote location from the certificate authority system.
Figure 3A:
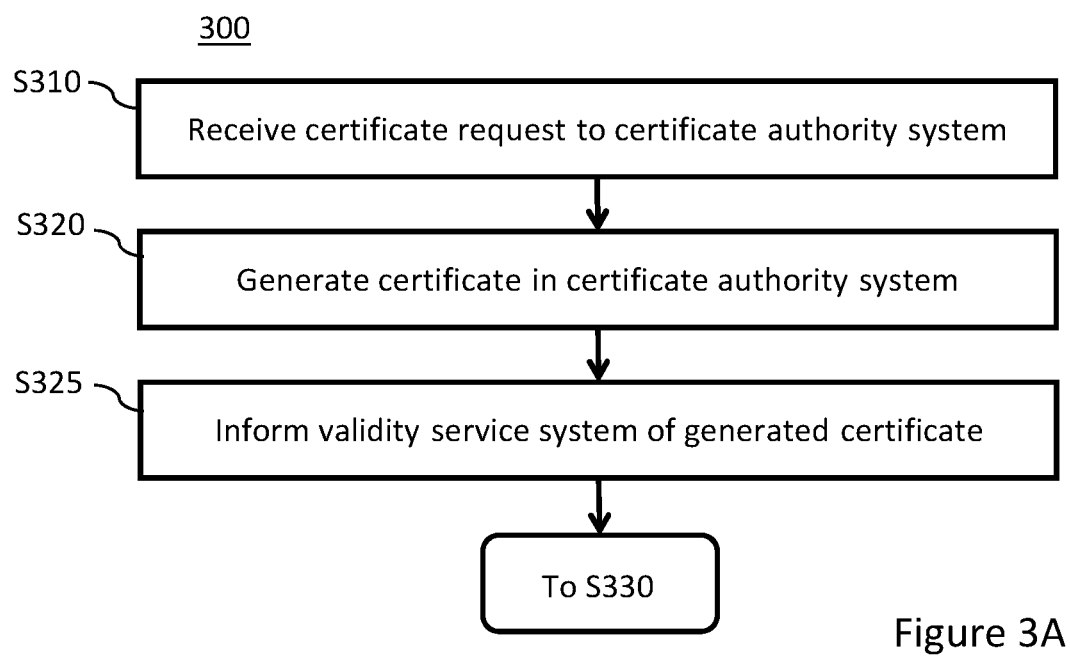
FIGS. 3A and 3B are flow charts of embodiments of a method in a certificate managing system of managing a certificate associated with a component.
Figure 3B:
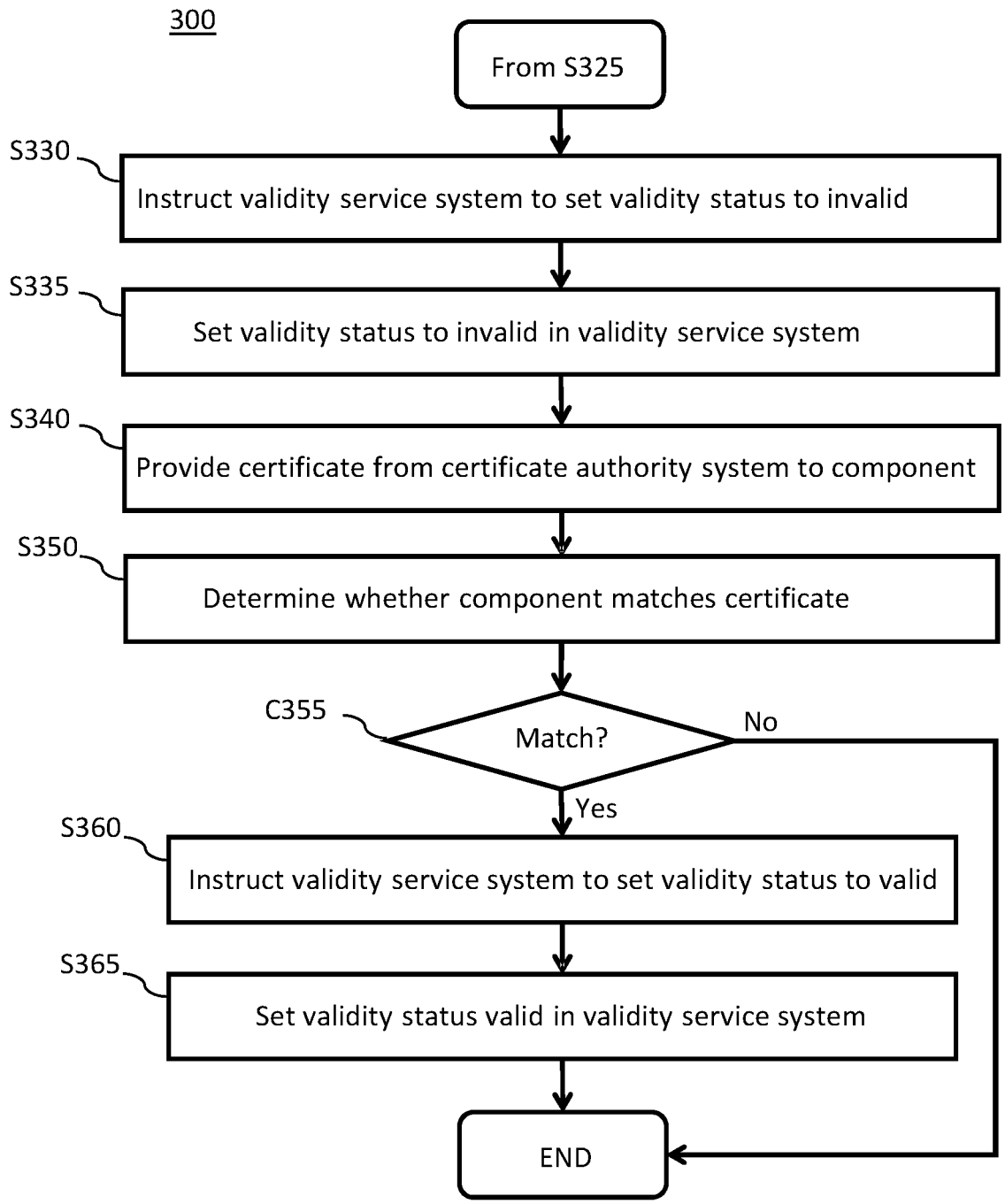
Figure 4:
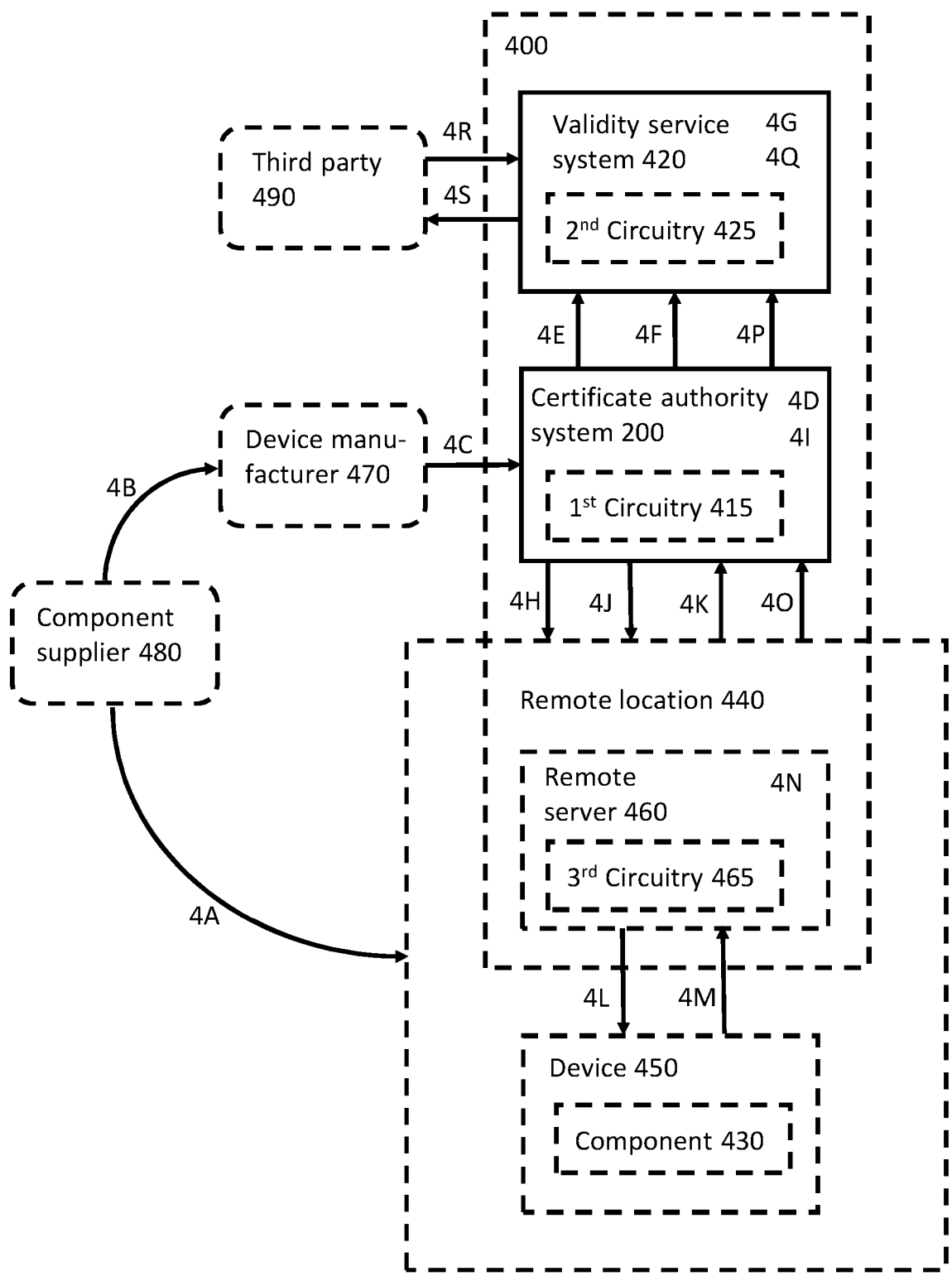
FIG. 4 is a schematic block diagram of embodiments of a certificate managing system for managing a certificate associated with a component located at a remote location from a certificate authority system.

FIG. 4 is a schematic block diagram of embodiments of certificate managing system 400 for managing a certificate in accordance with the methods described in relation to FIGS. 1, 3A, and 3B. The certificate managing system 400 comprises a certificate authority system 200, and a validity service system 420. The certificate authority system 200 may comprise first circuitry 415 configured to perform functions of the certificate authority system 200, e.g., functions corresponding to method steps as described in relation to FIGS. 1 and 3. The validity service system 420 may comprise second circuitry 425 configured to perform functions of the validity service system 420, e.g., functions corresponding to method steps as described in relation to FIGS. 1 and 3. The certificate is associated with a component 430 which is at some stage located at a remote location 440 and which is to be mounted in a device 450. The component 430 may either be a separate element such as a secure element, a trusted platform module or any type of secure cryptoprocessor, or it may be a subsystem of another component including also other functionalities. The certificate managing system 400 may further comprise a remote server 460 located at the remote location 440. The remote server 460 may comprise third circuitry 465 configured to perform functions of the remote server 460, e.g., functions corresponding to method steps as described in relation to FIGS. 1, 3A, and 3B.

A device manufacturer 470 manufactures the device 450, e.g., in a facility of the manufacturer or by means of an electronic manufacturing service (EMS), at the remote location 440. The device manufacturer 470 wants the device to be able to be authenticated, so the component 430 is to be mounted in the device 450 and be provided with a certificate (not shown) associated with the component. The device manufacturer 470 does not have control over the component 430 from purchase to mounting in the device.

Hence, in relation to a known system, the device manufacturer would typically not want the certificate to be provided to the component until it has been mounted in the device. Furthermore, since the manufacturing process is normally dependent of the provision of the certificate to the component, delay of provision of the certificate to the component may delay the manufacturing process. Furthermore, provision of the certificate to the component requires checking first that the component matches the certificate. Hence, in known systems, the checking that the component matches the certificate and the provision of the certificate to the component needs to be performed within a limit time period. This may be problematic in case a connection between the known system and the remote location cannot be guaranteed at all times or is even frequently unavailable. This issue and other is overcome by the methods and systems of the present disclosure.

FIG. 1 is a flow chart of embodiments of a method 100 in a certificate authority system 200 of managing a certificate associated with a component 430 located at a remote location 440 from the certificate authority system 200. The method 100 may as an example be performed in relation to the component 430 being mounted in a device 450 at the remote location 440 for use in authenticating the device 450. The device 450 may for example be a camera, such as a monitoring camera, printer, modem, router, switch, mobile phone, car or other device with connection to the internet. It is to be noted that the component 430 associated with the certificate need not be located at the remote location 440 from the certificate authority system 200 during all of the method steps of the method 100.

In the method 100, the certificate authority system 200 receives S110 a certificate request, wherein the certificate request comprises a key associated with the component 430.

The key is a cryptographic key for use in authentication and/or encryption. The key may be a public key of a private/public key pair associated with the component 430.

The certificate request may further comprise a device identity of a device 450 in which the component 430 is to be mounted, and a component identity of the component 430.

The device identity may be a device serial number or other identifier by which others uniquely identify the device. This device identity may be inscribed in the device and may be decided by the device manufacturer 470.

The component identity may be a serial number that uniquely identifies a component 430.

The certificate request may be in the form of a certificate signing request (CSR) or similar and may be signed by a further key associated with a party sending the certificate request. The further key may for example be the private key of a private/public key pair associated with the party requesting the certificate. This is beneficial for a scenario when the CSR is to be transmitted to the certificate authority system from a proxy, i.e., another party than the holder of the private/public key pair relating to the certificate to be generated. In such a case the certificate authority system should only accept the request when the proxy is a trusted party. The certificate authority system may then determine from the further key that the CSR is from a trusted party based on an identification that the further key is the private key of the trusted party. This enables the certificate authority system to prevent some other malicious party from having the certificate authority system to issue certificates for keys not in any component.

A certificate corresponding to the key associated with the component 430, such as the public key associated with the component 430, received in the certificate request is generated S120. The certificate comprises the key, such as the public key associated with the component, and may further comprise one or both of the component identity of the component.

The certificate authority system 200 causes S130 a validity status of the certificate to be set to invalid. The validity status of the certificate being set to invalid means that the certificate is currently not valid for use for authorisation. Different terms, such as invalid, revoked, on hold, unknown, etc., may be used depending on the type of system used all intended to be covered by the term invalid.

The certificate authority system 200 may cause the validity status of the certificate to be set to invalid by sending, to the validity service system 420, information indicating that the certificate has been generated and an instruction to set the certificate to invalid.

The validity status of the certificate should preferably be set to invalid as soon as possible after the certificate has been generated.

The validity status of the certificate should preferably be set to invalid without the validity being set to valid or interpreted as being set to valid any period of time before the being set to invalid.

The certificate is provided S140 to the component 430. The certificate may be provided to the component 430 by sending the certificate to the component 430 directly or indirectly via a remote server 460 located at the remote location 440.

In case the certificate is sent directly from the certificate authority server 200 to the component 430, the certificate may be sent or otherwise provided to the component 430 at any time. For example, the certificate may be provided to the component 430 before the component is transferred to the remote location 440.

In case the certificate is sent indirectly from the certificate authority system 200 to the component 430 via a remote server 460 located at the remote location 440, the certificate may be stored locally at the remote server 460 until a predetermined event when the certificate should be provided to the component 430. For example, the certificate may be provided to the component 430 from the remote server 460 upon determining that the component 430 has been mounted in the device 450.

It is then determined S150 whether the component 430 matches the certificate. Determining whether the component 430 matches the certificate may be done based on many different conditions relating to the properties of the component 430 and the certificate, respectively, including stored information, current status and location. For example, the component 430 may be determined to match the certificate based on the key of the component 430, which is also the key corresponding to which the certificate has been generated. For the case where the key is the public key of a private/public key pair, the component 430 is determined to match the certificate if it can be proven that the component 430 is in possession of the private key of that private/public key pair. The certificate authority system 200 may check whether the component 430 is in possession of the private key of the private/public key pair by sending a challenge to the component 430 for checking whether the component 430 matches the certificate and determine from a response to that challenge from the component 430 whether the response to the challenge verifies that the component 430 matches the certificate. The challenge may for example be a message encrypted with the public key of the private/public key pair, i.e., the public key associated with the certificate. If the response to the challenge from the component 430 shows that the component 430 was able to decrypt the message, this proves that the component 430 is in possession of the private key of the private/public key pair and hence that the component matches the certificate. The challenge may also be a request to the component 430 to return a response signed with its private key of the private/public key pair. If the response can be verified with the public key of the private/public key pair this proves that the component is in possession of the private key of the private/public key pair. The challenge may be sent directly to the component 430 or indirectly via the remote server 460 to the component 430 and the response may be received directly from the component 430 or indirectly via the remote server 460 from the component 430.

Furthermore, the remote server 460 may be used to determine whether the component 430 matches the certificate. If the remote server 460 determines that the component 430 matches the certificate, it sends a verification to the certificate authority system 200 that the component 430 matches the certificate upon which it is determined in the certificate authority system 200 that the component 430 matches the certificate. For example, a challenge may be sent from the remote server 460 to the component 430 and a response to the challenge may be received in the remote server 460 which determines whether the response to the challenge verifies that the component 430 matches the certificate, i.e., that the component 430 is in possession of the private key of the private/public key pair.

In the case where the certificate has been provided to the component 430 before the component was transferred to the remote location 440, i.e., before the component 430 is mounted in the device 450, the check whether the component 430 matches the certificate may be delayed until the component 430 has been mounted in the device 450. The validity status is then caused to be set to valid upon determining that the component 430 matches the certificate.

Further criteria may be required to be fulfilled in order for the component 430 to be determined to match the certificate. For example, it may be required that the component 430 is mounted in a particular device 450 identified by a device identity. The device identity may be provided in the certificate request and may be included in the certificate. Furthermore, it may be required that the component 430 is a particular component identified by a component identity. The component identity may be provided in the certificate request and may be included in the certificate.

Upon determining that the component 430 matches C155 the certificate, the certificate authority system 200 causes S160 the validity status to be set to valid, for example by instructing the validity service system 420 to set the validity status of the certificate to valid. The validity status of the certificate being set to valid means that the certificate is currently valid for use for authorisation. Different terms such as valid, good etc may be used depending on the type of system used all intended to be covered by the term valid.

Setting the validity status of the certificate to invalid and valid, e.g., in the validity service system 420, enables a third party to see if the certificate is valid or not by checking a current validity status of the certificate e.g., by requesting or accessing the validity status of the certificate in the validity service system 420.

If a certificate revocation list (CRL) is used as defined in the Request For Comments (RFC) 5280, a validity status of a certificate may be set to hold or to revoked. The validity status hold is reversible and can be used to note the temporary invalidity of the certificate. The validity status of the certificate can be set to valid again, thus removing the certificate from future CRLs. Hence, in the present method, the certificate authority system 200 may cause the certificate to be set to invalid by means of the status hold and then cause the validity status of the certificate to be set to valid again by removing the certificate from future CRLs.

If the online certificate status protocol (OCSP) as defined in RFC 6960 is used, this protocol lists three values for the validity status of a certificate, namely 0—good, 1—revoked, and 2—unknown. For a certificate that has the validity status revoked, a revocation reason can also be retrieved which as defined in RFC 5280 amongst others may be certificateHold. A certificate having the validity status revoked with revocation reason certificateHold may be used for temporary invalidity. The validity status may then be set to good again. Hence, in the present method, the certificate authority system 200 may cause the certificate to be set to invalid by means of the status revoked with revocation reason certificateHold and then cause the validity status of the certificate to be set to valid by means of the status good again.

Upon determining that the component does not match C155 the certificate, no change of validity status is caused so the validity status remains set to invalid.

Figure 2:
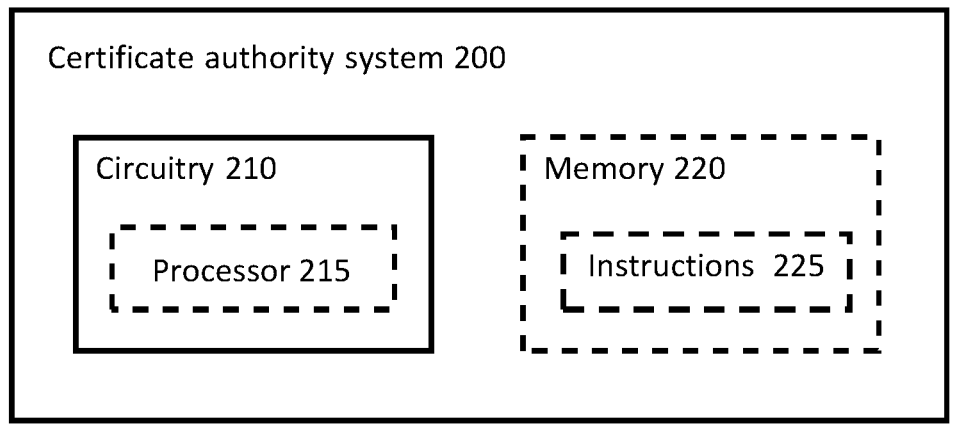
FIG. 2 is a schematic block diagram of embodiments of a certificate authority system for managing a certificate associated with a component located at a remote location from the certificate authority system.

FIG. 2 is a schematic block diagram of embodiments of a certificate authority system 200 for managing a certificate associated with a component 430 located at a remote location 440 from the certificate authority system 200. The certificate authority system 200 comprises circuitry 210 configured to carry out functions of the certificate authority system. The circuitry 210 may include a processor 215, such as a central processing unit (CPU), microcontroller, or microprocessor. The certificate authority system 200 may further comprise a non-transitory computer-readable storage medium, such as a memory 220. The memory 220 may be one or more of a buffer, a flash memory, a hard drive, a removable media, a volatile memory, a non-volatile memory, a random access memory (RAM), or another suitable device. In a typical arrangement, the memory 220 may include a non-volatile memory for long term data storage and a volatile memory that functions as system memory for the circuitry 220. The memory 220 may exchange data with the circuitry 210 over a data bus. Accompanying control lines and an address bus between the memory 220 and the circuitry 210 also may be present. The memory may comprise instructions 225 in the form of program code configured to carry out the functions of the certificate authority system 200 when executed by the processor 215. The functions of the certificate authority system 200 may for example be receiving a certificate request, wherein the certificate request comprises a key associated with the component 430; generating a certificate corresponding to the key received in the certificate request, causing a validity status of the certificate to be set to invalid; providing the certificate to the component 430; determining whether the component 430 matches the certificate; and upon determining that the component 430 matches the certificate, causing the validity status to be set to valid.

The certificate authority system 200 may be embodied in one server containing the certificate authority root certificate and issuing the certificate associated with the component 430. Alternatively, the certificate authority system 200 may be embodied in one server acting as a frontend for one or more hardware security modules (HSM:s) which contain the certificate authority root certificate and issues the certificate associated with the component 430. In a further alternative, the certificate authority system 200 may be embodied in one server acting as a frontend for a 'HSM cluster' using a plurality of trusted execution environments (TEE:s) together with for example secret sharing to split the certificate authority certificate among TEE instances whom all or some have to agree with issuing the certificates associated with the component 430. The TEE:s could be located in a mix between cloud and on-prem devices.

The functions of the certificate authority system 200 may be further adapted as the corresponding steps of the method 100 described in relation to FIG. 1.

FIGS. 3A and 3B are flow charts of embodiments of a method 300 in a certificate managing system 400 of managing a certificate associated with a component. The certificate managing system 400 in which the method 300 is performed comprises a certificate authority system 200, and a validity service system 420. The component 430 associated with the certificate is located at a remote location 440 from the certificate authority system 200; at least during a subset of the method steps of the method 300. A certificate request is received S310 in the certificate authority system 200. The certificate request comprises a key associated with the component 430. A certificate corresponding to the key received in the certificate request is then generated S320 in the certificate authority system 200, and information indicating that the certificate has been generated is sent S325 from the certificate authority system 200 to the validity service system 420. A validity status of the certificate is then caused to be set to invalid by sending S330, from the certificate authority system 200 to the validity service system 420, an instruction to set the certificate to invalid. The validity status of the certificate is then set S335 to invalid in the validity service system 420. The certificate is then provided S340 from the certificate authority system 200 to the component 430. It is then determined S350 in the certificate authority system 200 whether the component 430 matches the certificate. The determining whether the component 430 matches the certificate may be at any time, such as hours, days or weeks, after the provision of the certificate to the component 430. Upon determining that the component 430 matches C355 the certificate, the validity status of the certificate is caused to be set to valid by sending S360, from the certificate authority system 200 to the validity service system 420, an instruction to set the certificate to valid. The validity status of the certificate is then set S365 to valid in the validity service system 420. Upon determining that the component 430 does not match C355 the certificate, the validity status of the certificate is maintained invalid in the validity service system 420.

The certificate managing system 400 in which the method 300 is performed may further comprise a remote server 460 located at the remote location 440. The certificate may then be provided S340 from the certificate authority system 200 to the component 430 by sending the certificate from the certificate authority system 200 to the remote server 460, and sending or providing the certificate from the remote server 460 to the component 430. The certificate may be stored locally at the remote server 460 until a predetermined event when the certificate should be provided to the component 430. For example, the certificate may be provided to the component 430 from the remote server 460 upon determining that the component 430 has been mounted in the device 450.

The steps of the method 300 may be further adapted as the corresponding steps of the method 100 described in relation to FIG. 1.

Turning back to FIG. 4 is a schematic block diagram of embodiments of certificate managing system 400 for managing a certificate in accordance with the methods described in relation to FIGS. 1, 3A, and 3B.

In relation the certificate management system 400, a component supplier 480 provides 4A the component 430 to the remote location 440. The component supplier 480 further provides 4B a key associated to the component, typically a public key of a private/public key pair associated with the component 430, to the device manufacturer 470. The device manufacturer 470 then generates a certificate request and provides 4C the certificate request to the certificate authority system 200. In alternative, the key may be provided 4B to an agent acting on behalf of the device manufacturer 470, which agent generates the certificate request and provides 4C it to the certificate authority system 200. The certificate request and the certificate further may be a certificate request and certificate, respectively, as described in relation to FIG. 1.

A certificate (not shown) corresponding to the key received in the certificate request is then generated 4D in the certificate authority system 200, and information indicating that the certificate has been generated is sent 4E from the certificate authority system 200 to the validity service system 420. The certificate authority system 200 then causes a validity status of the certificate to be set to invalid by sending 4F to the validity service system 420, an instruction to set the validity status of the certificate to invalid. The validity status of the certificate is then set 4G to invalid in the validity service system 420. The certificate is then provided 4H from the certificate authority system 200 directly or indirectly via the remote server 460 to the component 450. If the certificate is provided indirectly via the remote server 460, the certificate may be stored locally at the remote server 460 until a predetermined event when the certificate should be provided to the component 430. For example, the certificate may be provided to the component 430 from the remote server 460 upon determining that the component 430 has been mounted in the device 450. It is then determined 4I in the certificate authority system 200 whether the component 430 matches the certificate. Determining 4I in the certificate authority system 200 whether the component matches the certificate may be done as described in relation to FIG. 1.

For the case where the key associated with the component 430 is the public key of a private/public key pair, the certificate authority system 200 may determine 4I whether the component 430 matches the certificate by sending 4J a challenge to the component 430 and determine from a response 4K to that challenge from the component 430 whether the response to the challenge verifies that the component 430 matches the certificate, as described in relation to FIG. 1. The challenge may be sent directly to the component 430 or indirectly via the remote server 460 and the response to the challenge may be received directly from the component 440 or indirectly via the remote server 460. In alternative, the remote server 460 may determine whether the component 430 matches the certificate by sending 4L a challenge to the component 430 and determine from a response 4M to that challenge from the component 430 whether the response to the challenge verifies that the component 430 matches the certificate, as described in relation to FIG. 1. Upon determining 4N in the remote server 460 that the component 430 matches the certificate, the remote server 460 sends 4O a verification that the component 430 matches the certificate to the certificate authority system 200, which then determines that the component 430 matches the certificate.

Upon determining in the certificate authority system 200 that the component 430 matches the certificate, the certificate authority system 200 causes the validity status of the certificate to be set to valid by sending 4P, to the validity service system 420, an instruction to set the validity status of the certificate to valid. The validity status of the certificate is then set 4Q to valid in the validity service system 420.

Upon determining that the component 430 does not match the certificate, the validity status of the certificate is not changed and hence maintained invalid in the validity service system 420. The certificate may have its status set to revoked, e.g., after a predetermined number of times a component 430 has been determined not to match the certificate, a predetermine period of time after it was generated, or a predetermine period of time after its status was set to invalid. The certificate authority system 200 and/or the validity service system 420 may include an interface for manually setting the validity status of the certificate to revoked.

A third party 490 may then check whether the certificate is valid by checking the validity status of the certificate in the validity service system 420, e.g., by sending 4R a request to the validity service server 420 and receiving 4S a response from the validity service system 420. Before the validity status of the certificate is set 4Q to valid in the validity service system 420, the response 4S will indicate that the validity status of the certificate invalid and after the certificate is set 4Q to valid in the validity service system 420, the response 4S will indicate that the validity status of the certificate is valid.

A person skilled in the art realizes that the present concepts are not limited to the embodiments described above. On the contrary, many modifications and variations are possible within the scope of the appended claims. Such modifications and variations can be understood and effected by a skilled person in practicing the claims, from a study of the drawings, the disclosure, and the appended claims.

The embodiments have mainly been described in relation to provision of a certificate form a certificate authority system to a component located at a remote location from the certificate authority system where the component is to be mounted in a device. However, the present teachings are equally applicable to any scenario where it is beneficial to separate the time when the certificate is provided to the component from a time when it is decided that the certificate matches the component and hence that the certificate should be possible to validly use for authentication. This is for example the case in scenarios when a timing of the provision of the certificate to the component is critical, but at the time of provision it is not possible to determine whether or not the certificate matches the component, e.g., due to lack of connection to the component.

The invention claimed is:

1. A method in a certificate authority system of managing a certificate associated with a component located at a remote location from the certificate authority system, comprising:
   receiving a certificate request, wherein the certificate request comprises a key associated with the component, and an identifier uniquely identifying a device in which the component is to be installed and wherein the key is a public key of a private/public key pair associated with the component;
   generating a certificate corresponding to the key received in the certificate request;
   causing a validity status of the certificate to be set to invalid;
   subsequent to causing the validity status of the certificate to be set to invalid, providing the certificate to the component, wherein the certificate is provided to the component based on determining that the component is installed on the device identified by the identifier;
   subsequent to providing the certificate to the component, determining whether the component matches the certificate by sending a challenge to the component, the challenge being a message encrypted with the public key of the private/public key pair, or a request to return a response signed by the component's private key of the private/public key pair;
   receiving the response wherein the response indicates successful decryption of the challenge by the component using the private key of the private/public key pair or wherein the response can be verified with the public key of the private/public key pair, and wherein the component matches the certificate when it is proven, based on receiving the response, that the component is in possession of the private key of the private/public key pair associated with the component; and
   upon determining that the component matches the certificate by proving that the component is in possession of the private key of the private/public key pair associated with the component, causing the validity status to be set to valid.

2. The method of claim 1, wherein providing the certificate to the component comprises:
   sending the certificate to the component directly or indirectly via a remote server located at the remote location.

3. The method of claim 2, wherein determining whether the component matches the certificate comprises:
   receiving, from the remote server, a verification that the component matches the certificate,
   upon receiving the verification, determining that the component matches the certificate.

4. The method of claim 1, wherein causing the validity status of the certificate to be set to invalid comprises:
   sending, to a validity service system, information indicating that the certificate has been generated; and
   sending, to the validity service system, an instruction to set the validity status of the certificate to invalid,
   and wherein the act of causing the validity status to be set to valid comprises:
   sending, to the validity service system, an instruction to set the validity status of the certificate to valid.

5. A certificate authority system for managing a certificate associated with a component located at a remote location from the certificate authority system, the certificate authority system comprising circuitry configured for performing a method comprising:
   receiving a certificate request, wherein the certificate request comprises a key associated with the component, and an identifier uniquely identifying a device in which the component is to be installed and wherein the key is a public key of a private/public key pair associated with the component;
   generating a certificate corresponding to the key received in the certificate request;
   causing a validity status of the certificate to be set to invalid;
   subsequent to causing the validity status of the certificate to be set to invalid, providing the certificate to the component, wherein the certificate is provided to the component based on determining that the component is installed on the device identified by the identifier;
   subsequent to providing the certificate to the component, determining whether the component matches the certificate by sending a challenge to the component, the challenge being a message encrypted with the public key of the private/public key pair, or a request to return a response signed by the component's private key of the private/public key pair;
   receiving the response, wherein the response indicates successful decryption of the challenge by the component using the private key of the private/public key pair or wherein the response can be verified with the public key of the private/public key pair and, wherein the component matches the certificate if it is proven, based on receiving the response, that when the component is in possession of the private key of the private/public key pair associated with the component; and
   upon determining that the component matches the certificate by proving that the component is in possession of the private key of the private/public key pair associated with the component, causing the validity status to be set to valid.

6. A method in a certificate managing system of managing a certificate associated with a component, the certificate managing system comprising a certificate authority system, and a validity service system, the component being located at a remote location from the certificate authority system, comprising:
   receiving, in the certificate authority system, a certificate request, wherein the certificate request comprises a key associated with the component, and an identifier uniquely identifying a device in which the component is to be installed and wherein the key is a public key of a private/public key pair associated with the component;

generating, in the certificate authority system, a certificate corresponding to the key received in the certificate request;

sending, from the certificate authority system to the validity service system, information indicating that the certificate has been generated;

causing a validity status of the certificate to be set to invalid by sending, from the certificate authority system to the validity service system, an instruction to set the validity status of the certificate to invalid;

setting, in the validity service system, the validity status of the certificate to invalid;

subsequent to causing the validity status of the certificate to be set to invalid, providing the certificate from the certificate authority system to the component, wherein the certificate is provided to the component based on determining that the component is installed on the device identified by the identifier;

subsequent to providing the certificate from the certificate authority system to the component, determining, in the certificate authority system, whether the component matches the certificate by sending a challenge to the component, the challenge being a message encrypted with the public key of the private/public key pair, or a request to return a response signed by the component's private key of the private/public key pair;

receiving the response, wherein the response indicates successful decryption of the challenge by the component using the private key of the private/public key pair or wherein the response can be verified with the public key of the private/public key pair and wherein the component matches the certificate when it is proven, based on receiving the response, that the component is in possession of the private key of the private/public key pair associated with the component;

upon determining that the component matches the certificate by proving that the component is in possession of the private key of the private/public key pair associated with the component, causing the validity status to be set to valid by sending, from the certificate authority system to the validity service system, an instruction to set the validity status of the certificate to valid; and setting, in the validity service system, the validity status of the certificate to valid.

7. The method of claim 6, wherein the certificate managing system further comprises a remote server located at the remote location, and wherein providing the certificate from the certificate authority system to the component comprises:

sending the certificate from the certificate authority system to the remote server; and sending the certificate from the remote server to the component, and wherein the act of determining, in the certificate authority system, whether the component matches the certificate comprises:

determining, in the remote server, whether the component matches the certificate;

upon determining, in the remote server, that the component matches the certificate, sending, from the remote server to the certificate authority system, a verification that the component matches the certificate;

upon receiving the verification, determining, in the certificate authority system, that the component matches the certificate.

8. A non-transitory computer-readable storage medium having stored thereon instructions for managing a certificate associated with a component located at a remote location from a certificate authority system, the instructions implementing a method comprising:

receiving a certificate request, wherein the certificate request comprises a key associated with the component, and an identifier uniquely identifying a device in which the component is to be installed and wherein the key is a public key of a private/public key pair associated with the component;

generating a certificate corresponding to the key received in the certificate request;

causing a validity status of the certificate to be set to invalid;

subsequent to causing the validity status of the certificate to be set to invalid, providing the certificate to the component, wherein the certificate is provided to the component based on determining that the component is installed on the device identified by the identifier;

subsequent to providing the certificate to the component, determining whether the component matches the certificate by sending a challenge to the component, the challenge being a message encrypted with the public key of the private/public key pair, or a request to return a response signed by the component's private key of the private/public key pair;

receiving the response, wherein the response indicates successful decryption of the challenge by the component using the private key of the private/public key pair or wherein the response can be verified with the public key of the private/public key pair and wherein the component matches the certificate when it is proven, based on receiving the response, that the component is in possession of the private key of the private/public key pair associated with the component; and upon determining that the component matches the certificate by proving that the component is in possession of the private key of the private/public key pair associated with the component, causing the validity status to be set to valid.

9. A certificate managing system for managing a certificate associated with a component located at a remote location from a certificate authority system, the certificate managing system comprising:

the certificate authority system; and a validity service system, wherein the certificate authority system comprises first circuitry configured for:

receiving a certificate request, wherein the certificate request comprises a key associated with the component, and an identifier uniquely identifying a device in which the component is to be installed and wherein the key is a public key of a private/public key pair associated with the component;

generating a certificate corresponding to the key received in the certificate request;

sending, to the validity service system, information indicating that the certificate has been generated;

causing a validity status of the certificate to be set to invalid by sending, to the validity service system, an instruction to set the certificate to invalid;

subsequent to causing the validity status of the certificate to be set to invalid, providing the certificate from the certificate authority system to the component, wherein the certificate is provided to the component based on determining that the component is installed on the device identified by the identifier;

subsequent to providing the certificate from the certificate authority system to the component, determining whether the component matches the certificate by sending a challenge to the component, the challenge being a message encrypted with the public key of the private/public key pair, or a request to return a response signed by the component's private key of the private/public key pair;

receiving the response, wherein the response indicates successful decryption of the challenge by the component using the private key of the private/public key pair or wherein the response can be verified with the public key of the private/public key pair and wherein the component matches the certificate when it is proven, based on receiving the response, that the component is in possession of the private key of the private/public key pair associated with the component; and upon determining that the component matches the certificate by proving that the component is in possession of the private key of the private/public key pair associated with the component, causing the validity status of the certificate to be set to valid by sending, to the validity service system, an instruction to set the validity status of the certificate to valid, and wherein the validity service system comprises second circuitry configured for:

upon receiving the instruction to set the validity status of the certificate to invalid, setting the validity status of the certificate to invalid; and upon receiving the instruction to set the validity status of the certificate to valid, setting the validity status of the certificate to valid.

10. The certificate managing system of claim 9, wherein the system further comprises a remote server located at the remote location, wherein the first circuitry of the certificate authority system is further configured for:

sending the certificate to the remote server, wherein the remote server comprises third circuitry configured for:

sending the certificate to the component;

determining whether the component matches the certificate; and upon determining that the component matches the certificate, sending, to the certificate authority system, a verification that the component matches the certificate, and wherein first circuitry of the certificate authority system is further configured for:

upon receiving the verification from the remote server, determining that the component matches the certificate.

* * * * *